C. WHIPPLE.
Machine for Making Wood Screws.
No. 4,106.
4 Sheets—Sheet 1.
Patented July 10, 1845.
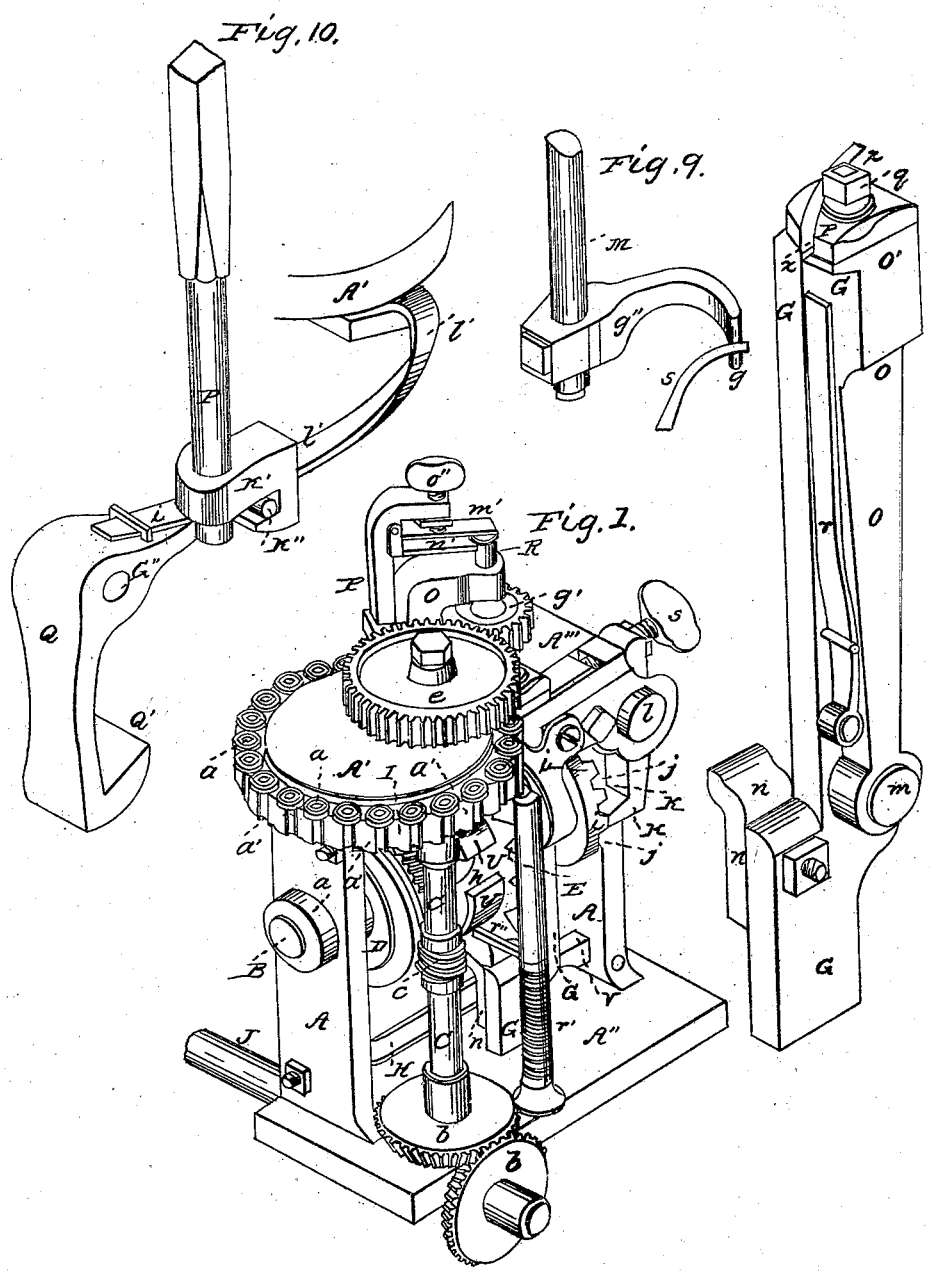

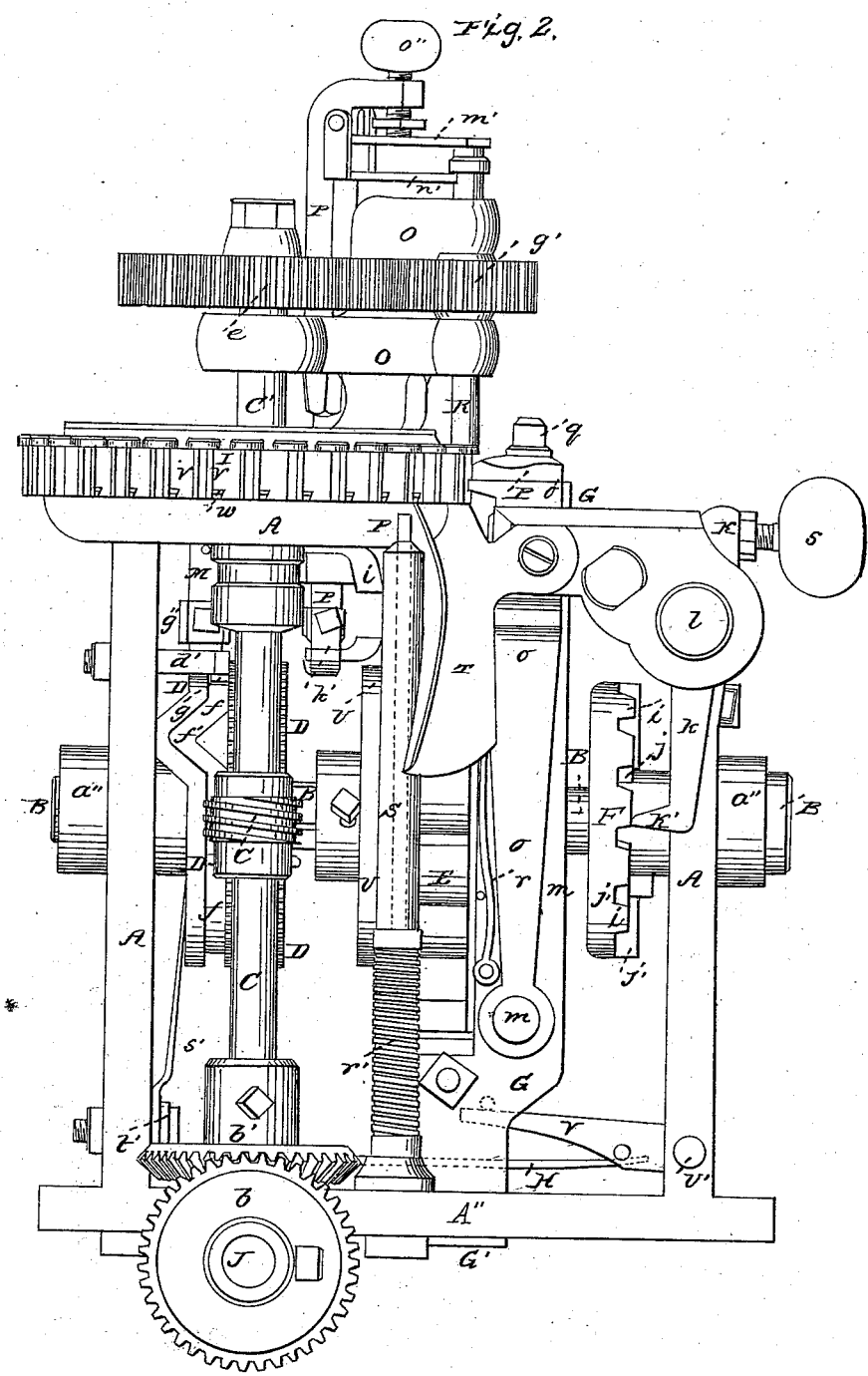

C. WHIPPLE.
Machine for Making Wood Screws.
No. 4,106.
4 Sheets—Sheet 3.
Patented July 10, 1845.
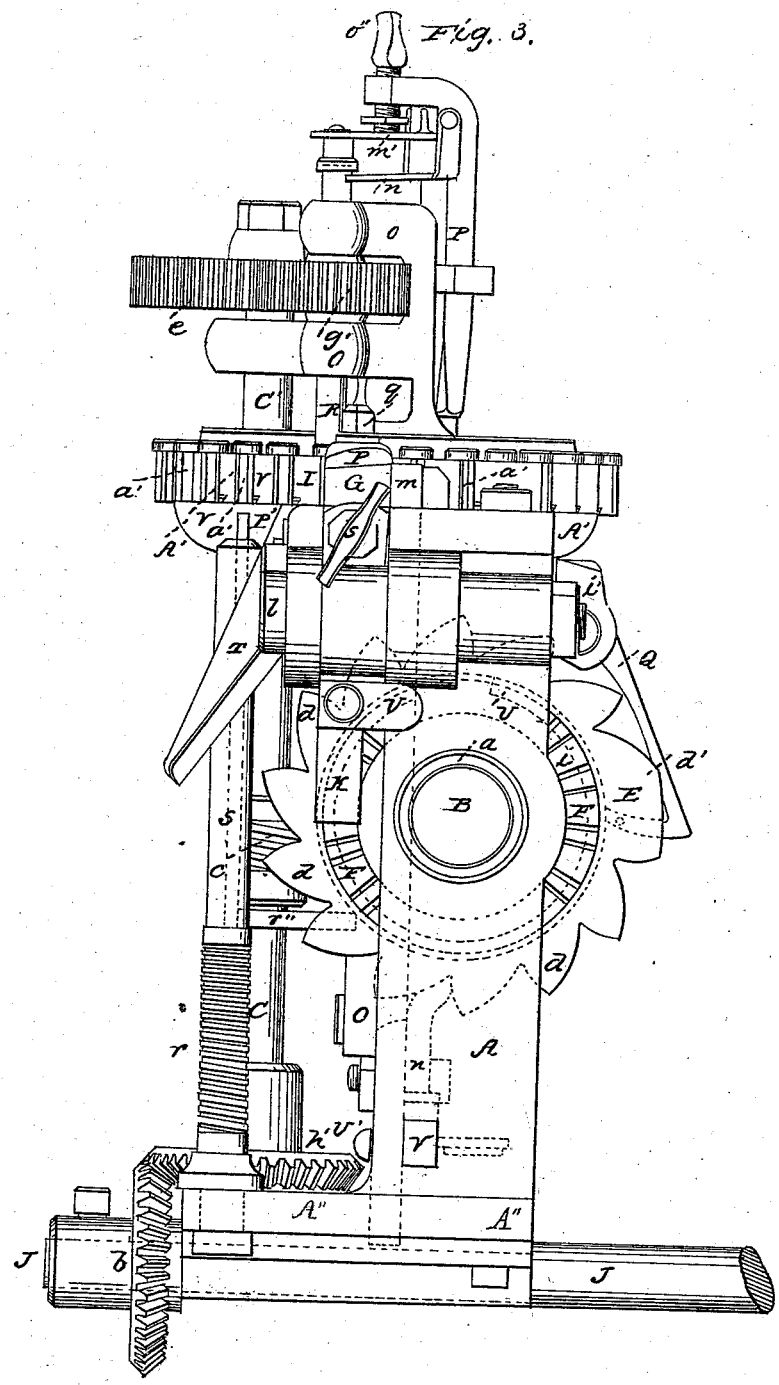

C. WHIPPLE.
Machine for Making Wood Screws.
No. 4,106.
4 Sheets—Sheet 4.
Patented July 10, 1845.
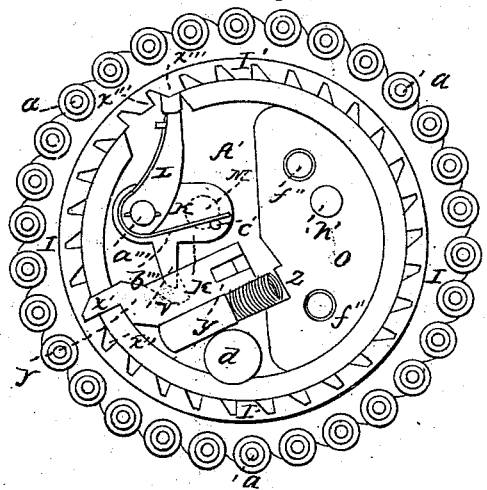
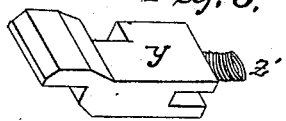
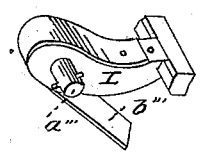
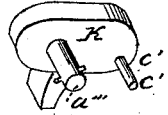
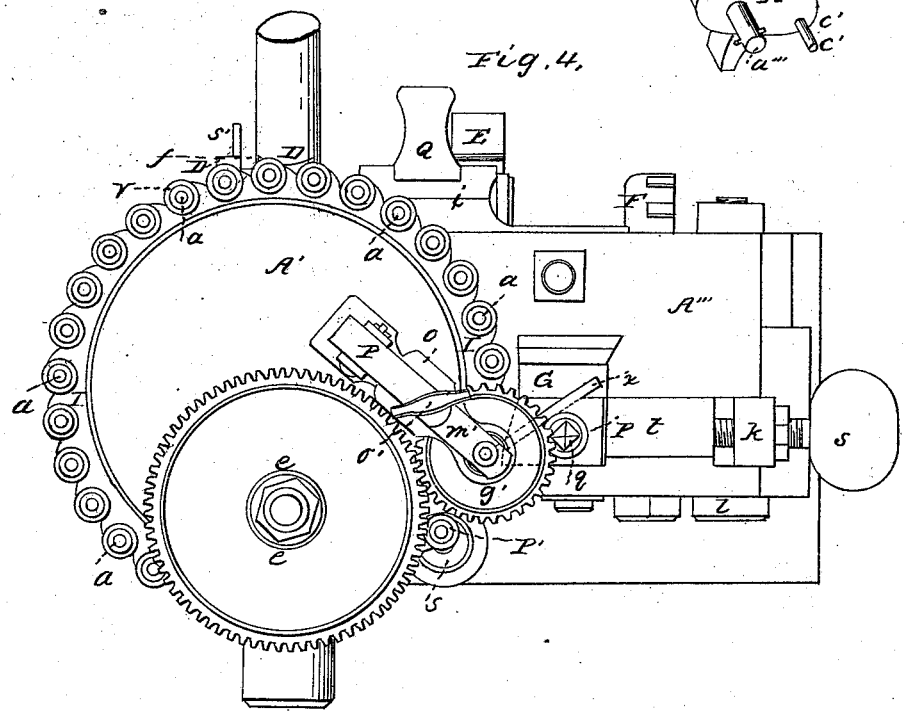

UNITED STATES PATENT OFFICE.

CULLEN WHIPPLE, OF PROVIDENCE, RHODE ISLAND.

IMPROVEMENT IN MACHINERY FOR CUTTING WOOD-SCREWS.

Specification forming part of Letters Patent No. 4,106, dated July 10, 1845.

*To all whom it may concern:*

Be it known that I, CULLEN WHIPPLE, of the city of Providence, in the county of Providence and State of Rhode Island, have invented a new and useful Machine for Cutting the Threads upon Wood-Screws, which machine I denominate the "Self-Adjusting Screw-Finisher;" and I do hereby declare that the following is a full and exact description thereof.

The cutter or chaser by means of which the threads are to be cut is the same in all respects with that described and claimed by me in the specification of Letters Patent for a machine for cutting the threads upon wood-screws, granted to me under date of the 18th of August, in the year 1842; but the combination and arrangement of the other parts of the machinery, which I am now about to describe, differ essentially from that which was the subject of the patent above referred to.

In the accompanying drawings, Figure 1 is a perspective view of the whole machine drawn to a scale of one-half the medium size—say for screws of three-quarters of an inch in length. Fig. 2 is a front elevation of such a machine of the full size. Fig. 3 is a view of the right-hand end thereof. Fig. 4 is a top view with the omission of certain parts shown fully in the next figure. Fig. 5 is a top view of the apparatus into which the blanks that are to be cut are to be fed and by which they are successively presented to the action of the tool for cutting the thread. Most of the operating parts shown in this figure are omitted in each of the others. The other figures represent parts in detail which could not be otherwise fully shown. In each of these figures where the same parts are shown they are designated by the same letters of reference.

A A is the frame-work of the machine, which may be of cast-iron. The part A' is a circular horizontal table, upon which is sustained a movable zone or ring I I' and the apparatus by which it is governed in its motion, these parts being distinctly shown in Fig. 5. The zone or ring I I' rests loosely upon the horizontal table A', and is kept in place by means of a projecting circular rim N, Fig. 5, attached to or in one piece with the circular table A'. The outer portion I of the ring has on its periphery a series of tubes $a\ a$, into which the blanks are to be fed. These tubes are countersunk at the upper ends, so as to adapt them to the heads of the blanks, and below the countersunk part a portion of each tube is cut away, as shown at $a'\ a'$, to admit the end of the cutter or chaser. The blank which is being cut is made to revolve within its tube by means of a revolving screw-driver, which takes into the nick on its head and is operated in a manner to be presently described.

J J is a horizontal shaft, which may be connected with the first mover for the purpose of driving the machine. On this shaft there is a bevel-wheel $b$, which gears into the bevel-wheel $b'$ (see Fig. 1) on the vertical shaft C. On this latter shaft there is an endless screw or worm $c$, that meshes into a worm-wheel D D on the main horizontal shaft B B, to which it consequently gives motion. This shaft runs in boxes $a''\ a''$, attached to the frame. The shaft C passes up through the table A', in which it has its upper bearing. Its continuation is seen at C', and to its upper end is affixed the spur-wheel $e$, which, gearing into the wheel $g'$ on a shaft R, (which is that which carries the screw-driver,) gives motion thereto.

G G (shown in detail in Fig. 11) is a bar which I will call the "vertical cutter-slide." This may be rectangular, and it passes through mortises in the bed A'' and in the upper part A''', Figs. 1 and 3, of the frame. In these it slides up and down freely as the thread is chased by the cutter. The cutter is not attached directly to the bar G, but to the upper end of a lever $o\ o$, which works on a fulcrum-pin $m$, by which it is connected to said bar. The lever $o$ allows the cutter to move laterally to and from the blank to be cut. The head $o'$ of this lever is widened out for the purpose of sustaining the cutter, which is shown in place at $x\ x$, Figs. 4 and 11. This is held in place by the cap P, which has a curved groove on its under side to receive it, the screw $q$ passing through said cap and into the head $o'$ of the lever. $r$ is a steel spring that bears against the inner side of the lever $o$, serving to force it back when not pressed up by the apparatus by which the cutter is made to operate on the blank, which I will now describe.

E (shown most distinctly in Figs. 2 and 3) is a cam-wheel made fast on the main horizontal shaft B. The periphery of this wheel is divided into fourteen equal parts, and is cut so as to have on it thirteen tooth-like projections $d\ d\ d'$, Fig. 3, the part $d'$ occupying two of the fourteen divisions, leaving twelve $d\ d$ equal in size. Each of these projections operates as a cam in causing the cutter to operate on a blank. The number of equal projections determines the number of times that each blank shall be acted on by the cutter, and this number may be varied; but that which I have given is found sufficient for screws of ordinary size. To the cutter-slide G is attached a hardened-steel bearing-piece $n$, the upper end of which is in the form represented, and is kept in contact with the projections $d\ d$ of the cam-wheel. This wheel, therefore, by its revolution will depress the slide and carry the cutter down. The cam-teeth and the bearing-piece $n$ are made very true and smooth. The faces of the projections $d$, which act on the piece $n$, are finished to an irregular curve, which is such as to cause the direct downward motion of the slide to be equal in equal periods of time, the motion of the wheel being uniform. The slide G is raised in the following manner after each descent: H is a steel spring (shown most plainly in Fig. 2) which presses on a lifting-piece V, that works on a joint-pin U' and bears against a pin on the back side of the slide G. At the time when this lifting is effected the cutter is drawn off from the blank by the action of the gage-wheel F and its appendages.

F, Figs. 2 and 3, is what I call the "gage-wheel," which is affixed to the horizontal shaft B. This wheel has a projecting rim $i\ i$ on its face, like a crown-wheel, which is divided into a number of parts corresponding with those of the projections on the cam-wheel, there being thirteen recesses or notches $j\ j$, twelve of which are of one size, while the other $j'$ corresponds with the projection $d'$ on the cam-wheel. The gage-wheel F is intended to regulate the feed of the cutter in its successive actions on the blank. Under the arrangement described the cutter will, as before remarked, operate twelve times in forming the thread of each screw, the operation on each being completed by one revolution of the shaft B. The cutter is forced up against the blank in the following manner: $k$ is a lever which works on a fulcrum-pin $l$, and the end $k'$ of which bears upon the face of the projecting rim $i\ i$ of the gage-wheel during the time that the cutter is operating upon the blank. When the point $k'$ is by the revolution of the wheel F brought opposite to one of the recesses $j$, the lever $o$, with its cutter, is pressed back by the action of the spring $r$, and at the same instant the piece $n$ falls into one of the notches on the cam-wheel, the slide G rising, consequently, to its original elevation. The lever $k$ advances the cutter against a blank by bearing against a sliding piece $t$, which bearing is regulated by means of a thumb-screw $s$. Every successive cut of the tool must of course be to a greater depth than that which preceded it, and this is effected in the following manner: The face of the projecting rim $i\ i$ of the wheel F is not in a vertical plane; but each projecting portion rises by a regular inclination beyond that which preceded it, which rise amounts in machines intended for cutting ordinary three-quarter-inch screws, to about one-twelfth of an inch in its whole circumference. By this manner of forming the gage-wheel is also obtained the right taper on the screw. T is a conductor down which the chips pass from the cutter.

When the cutting of the screw is to be commenced, the screw-driver must be forced down so as to enter the nick on the blank, and when it has been completed it must be raised therefrom, and the zone or ring I I' must be moved so far round as to bring another blank into the proper situation for the action of the cutter.

The apparatus for depressing and raising the screw-driver is as follows: On one side of the cam-wheel E there is attached a broad rim or hoop U U, Figs. 1 and 2, and the situation of which is indicated also by the dotted lines U U, Fig. 3. This hoop is continuous for about ten-elevenths of a circle, about one-eleventh of it being removed, as at the part $h$. The outer surface of it is made perfectly true and smooth, and there bears on it one end of a crooked lever Q, which is shown separately in Fig. 10. Its end Q' is that which bears on the hoop U U. It has a fulcrum-pin at Q''. $k''$ is a pin attached to the upper end of this lever, which pin enters a notch or opening in a piece $k'$, to which is attached the vertical sliding rod P, that makes a part of the sliding frame P P, Figs. 1 and 3, which frame sustains the shaft of the screw-driver. When by the revolution of the cam-wheel the end Q' of the lever Q is brought opposite to the opening $h$ in the hoop U U, it falls into it, and the sliding frame P, with the screw-driver attached to it, is raised. The lever Q is kept in contact with the hoop U U by the action of a spring $l'$, that bears against it and is attached to the circular table A'. The passing of the end of the lever Q into the recess in the hoop U occurs at the moment that a screw has been finished. R, Figs. 2 and 3, is the shaft of the screw-driver. This shaft passes through and revolves within the two arms O O, Fig. 3, making a part of the stationary screw-driver frame. By means of a feather the shaft R slides freely up and down through the wheel $g'$, which is driven by the wheel $e$. O, Fig. 5, is the bottom plate or basis of the frame O O, which is fastened onto the top of the circular table A by screws, as at $f''\ f''$. The upper end of the shaft R is connected to the sliding frame P by the springs $m'\ n'$, Fig. 3. The lowermost of these springs serves to lift it, and the upper one, by means of the thumb-screw $o''$, serves to adjust it to the different thicknesses of the heads of the blanks. The shaft R is depressed and the screw-driver kept in contact with the blank by the bearing of the lever Q on the hoop U U.

The removing of the finished screw from the tubes $a$ is effected by the aid of the same hoop U that is concerned in the depressing and raising of the screw-driver. S, Figs. 2 and 3, is a stationary tubular rod placed vertically, which receives within it a small sliding rod $p'$. There is a slot along the rod S, and a small arm $r''$, attached to the sliding rod $p'$, passes through this slot and bears upon the periphery of the hoop U until it arrives at the opening $h$. While it bears on the hoop the rod $p'$ is depressed; but when it enters the opening $h$ the spiral spring $r'$ forces the rod $p'$ up, which, passing into the tube containing the last but one finished screw, removes it and it falls into a receiver.

The apparatus used for causing the zone or ring I I' to revolve and carry a blank to the distance necessary to its being operated on by the cutter is shown in Figs. 2, 5, 6, 7, 8, and 9. One side of the worm-wheel D D is widened out, so as to have a guide-groove $f$ $f'$ formed upon it. This groove passes uniformly round the wheel, excepting at the point $f'$, Fig. 2, where it forms an angle, as represented. This groove receives the pin $g$, which constitutes the end of a short arm $g'''$. (Seen separately in Fig. 9.) From this arm a shaft M rises vertically and passes through the circular table A', and is firmly attached to an arm or lever K, which rests on the top of the table, as seen in Fig. 5. The piece K is shown separately in Fig. 8, and the part of it to which the shaft M is attached is represented by dotted lines in Fig. 5. While the pin $g$ remains in the direct part of the groove $f f$ the piece K remains stationary; but when it enters the angular part $f'$ the shaft M is made to revolve partially back and forth and carries with it the piece K. The arm $g''$ is situated below the table A'. The shaft M, to which it is attached, has its step in the stud $d'$. To cause the pin $g$ to pass readily back into the straight part of the groove $f$, a spring $s'$, the lower end of which is seen in Fig. 2, is made to bear against said pin, as shown in Fig. 9. The finger V on the piece K draws back the bolt $y$, Fig. 5, (seen separately in Fig. 6,) so as to relieve it from one of a series of notches on the interior edge of the ring I I'. These notches $x'$ $x''$, &c., correspond in number and position with the tubes for the blanks, and it will be manifest that the bolt $y$ when inserted in one of these notches will keep the ring stationary. The bolt $y$ is forced into the notches by means of a spiral spring $z$ acting against the plate O. To the piece K is also connected the feed-hand L by a joint-pin $a'''$. This feed-hand carries the ring I I' round to the requisite distance. The steel spring $b'''$, which has a bearing on the pin $c'$, serves to throw the feed-arm forward to the proper position to bear against the angle of one of the notches, as seen at $x''''$.

In describing the various parts of this machine I have also shown the manner in which they are intended to operate; but I will now give a general view of the action of the whole. The tubes $a\ a$ in the horizontal ring I I' are to be kept supplied with blanks, which are to be fed in by hand. Immediately preceding the first operation of the cutter on a blank the lever Q will have occupied the recess $h$ in the hoop U on the cam-wheel, and the lever $k$ the recess $j'$ in the gage-wheel, and the machine being in motion the cutter-slide G G will be raised by the action of the spring H on the joint-piece $u$. At the commencement of the ascent of the cutter-slide the cutter will be thrown back by the action of the spring $r$ on the lever $o$. During this period of time the revolving of the hoop U on the cam-wheel will bring the end of the lever Q which had occupied the recess $h$ in contact with said hoop, on the periphery of which it will rise, thereby lowering the screw-driver shaft, when the screw-driver will enter the nick on the blank, which it will cause to revolve rapidly. The lever $k$ also at the proper instant will leave the recess on the gage-wheel and bear on a projecting part of its rim, bringing the cutter into contact with the blank. That one of the tooth-like projections on the cam-wheel which is next to the double one will at the same time be in contact with the steel bearing-piece $n$, and the cutter will be thereby caused to make its first cut, which, being succeeded by the action of the remaining cam-teeth, completes the screw. At the time of the completion of the screw last cut the revolution of the cam-wheel will have brought the hoop U into the position in which the end of the lever Q will enter the recess $h$, and the screw-driver will be lifted. At this time the cutter will have been withdrawn from the screw, and the point $g$ of the arm $g''$, traversing in the guide-groove $f f$ of the worm-wheel, will have attained its greatest variation from its direct course in the angular part of the said groove $f'$, in passing and returning along which it will have given the revolving motion to the shaft M necessary to the operation of the parts concerned in the shifting of the ring I I' one notch in the manner above described, which will bring a fresh blank into a situation to be operated on by the cutter, and will also bring the cut screw directly over the rod $p'$. This screw will be removed by the passing of the small arm $r''$ into the recess $h$ by the revolution of the hoop U, which will leave the rod $p'$ free to rise by the action of the spiral spring $r'$.

Having thus fully described the manner in which I construct, combine, and arrange the respective parts of my self-adjusting screw-finisher, what I claim therein as new, and desire to secure by Letters Patent, is—

1. The manner in which I arrange the horizontal ring or zone I I' and its surrounding tubes for receiving the blanks, in combination with the apparatus by which said ring or zone is made to revolve to the requisite distance to bring a fresh blank opposite to the cutter after a screw has been finished.

2. The manner in which I have combined the cam-wheel, the vertical cutter-slide, and the lever thereon which sustains the cutter, so that the respective parts shall co-operate, substantially as set forth.

3. The gage-wheel, with the inclination of its projecting rim and the recesses thereon, in combination with the spring-lever upon which said rim operates, by which the cutter is brought into contact with and removed from the blank which is being cut, as described.

4. The manner in which I have combined the stationary and the sliding frames of the screw-driver with the vertical shaft and with the lever which bears on the revolving ring, so as to raise and lower said screw-driver, in the manner and for the purpose herein set forth.

It is to be distinctly understood that I do not intend by the foregoing claims to limit myself to the precise arrangement or form of the respective parts as herein represented, but to vary these as I may think proper, while I attain the same end under an arrangement and combination substantially the same.

CULLEN WHIPPLE.

Witnesses:
 WM. H. SWEET,
 ABRAHAM PAYNE.